C. O. HALL.
SIGNALING DEVICE FOR ROAD VEHICLES.
APPLICATION FILED NOV. 28, 1914.

1,241,373.

Patented Sept. 25, 1917.
2 SHEETS—SHEET 1.

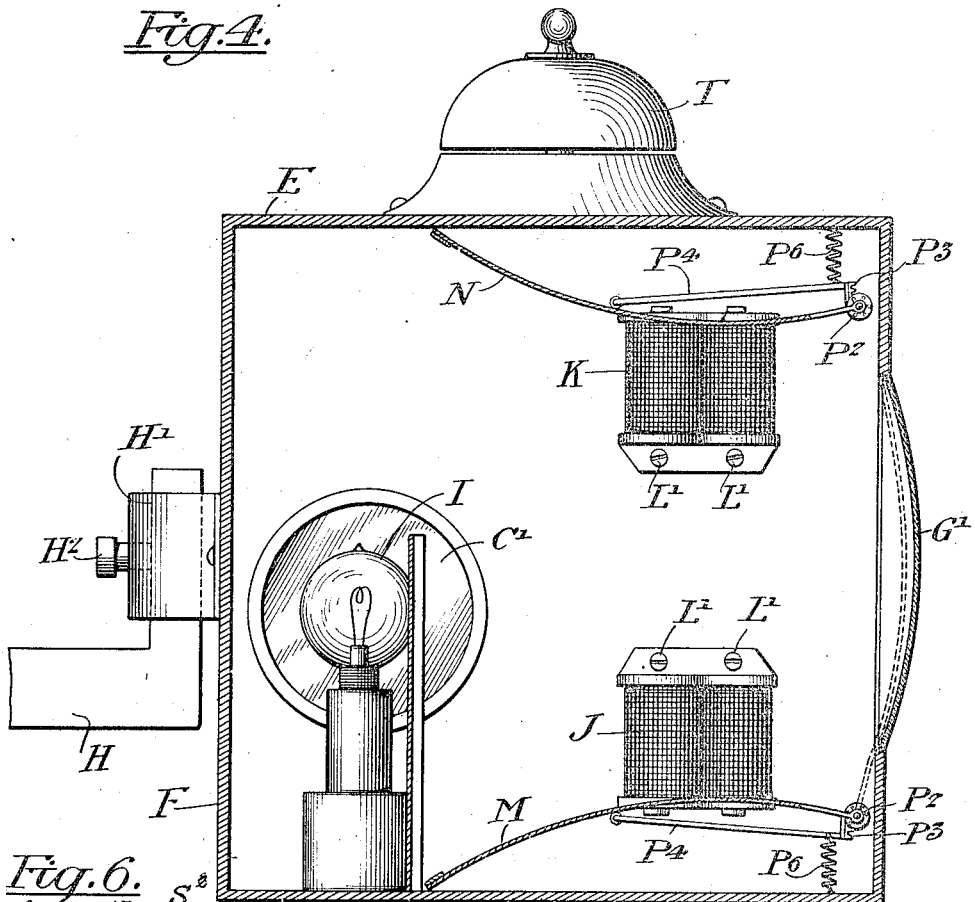
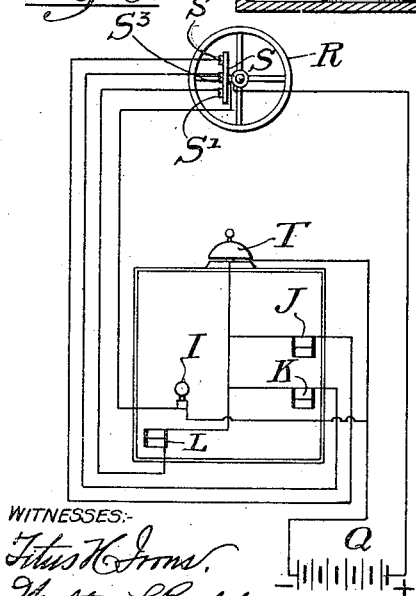
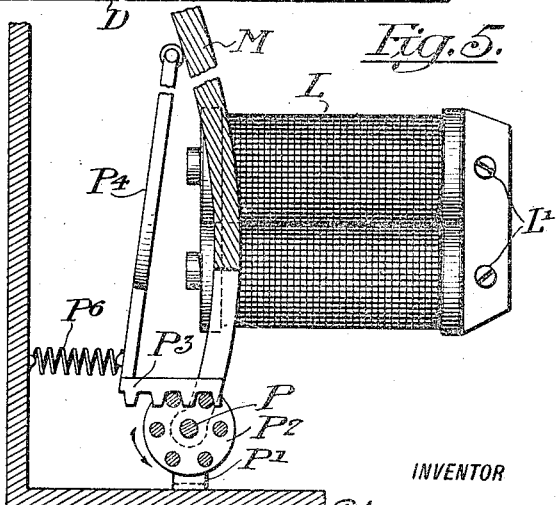

UNITED STATES PATENT OFFICE.

CHARLES O. HALL, OF NEW YORK, N. Y.

SIGNALING DEVICE FOR ROAD-VEHICLES.

1,241,373.

Specification of Letters Patent. Patented Sept. 25, 1917.

Application filed November 28, 1914. Serial No. 874,375.

*To all whom it may concern:*

Be it known that I, CHARLES O. HALL, of the borough of Manhattan, in the city, county, and State of New York, have invented certain new and useful Improvements in Signaling Devices for Road-Vehicles, of which the following is a full, clear, and exact specification, such as will enable others skilled in the art to which it appertains to make and use the same.

As is well known to owners and operators of road vehicles, a fruitful source of accidents, particularly in places where a large number of vehicles follow one after the other, is the lack of means to indicate to the driver of a vehicle following another, the intention of the driver of the vehicle ahead, as to turning out, to the right or left, from the general path of travel, or coming to a stop. Assuming that two or more vehicles are traveling in the same direction at the same rate of speed, and that the foremost one of such vehicles is compelled by an obstacle ahead, unperceived by the driver of the vehicle following, to suddenly turn out or stop, the vehicle following is very likely, if fairly close to the vehicle ahead, to collide with the same, causing damage to the vehicles, and injuring the occupants.

One of the objects, therefore, of my invention is to provide a signaling system readily controlled by the driver of a vehicle and capable of instantaneous action, whereby drivers of vehicles following may be advised of the course intended to be taken by the vehicle ahead, for example whether he will turn to the right or to the left or come to a stop. Thereby the driver of the vehicle following may have sufficient notice to properly control his vehicle, and he in turn by a similar device may indicate to the drivers following him what he will do, and thereby eliminate to a considerable extent the danger incident to road travel at the present time.

Another object of my invention is to provide a signaling device which is more especially adapted for use upon automobiles, but its application is not limited thereto, as it may be used in connection with other road vehicles as well.

Another object of my invention is to provide such a signaling device capable of ready and instantaneous operation by the driver of the vehicle.

Another object of my invention is to provide such a device which is simple and economical in construction and whose indicating parts are automatically returned to inoperative position when they have served the purpose intended.

Another object of my invention is to provide such a signaling device which is compact and combines therewith the qualities of the ordinary tail lamp now in use on automobiles.

Another object of my invention is to provide such a device which will be ready of application to an automobile and which will be so constructed that its signaling or indicating parts will be observable in either daylight or darkness.

Other objects ancillary to the foregoing will be readily apparent from the following description taken in connection with the accompanying drawings in which:—

Fig. 4 is a vertical section on line 4—4 of Fig. 3;

Fig. 5 is an enlarged detail of one of the operating magnets and operating parts connected thereto; and, Fig. 6 is a diagrammatic view showing the wiring and other parts of the signaling system.

Referring to the construction illustrated A indicates in whole, a signaling box comprising the side members B, C, the bottom member D, the top member E, the rear member F and the front member G, (by the front member meaning the front of the signaling box). It will be understood that the signaling box occupies a position at the rear of the vehicle, being attached thereto in any suitable manner, as for example by a bracket H secured to the vehicle and a bracket H′ secured to the signaling box, the parts being held together by the set-screw H². The side member C is provided with the usual side light or lens C′ and the front member G with the tail light lens indicated at G′. The front member G may be hingedly mounted as at G², G³, to afford access to the interior of the casing, and at the opposite side may be provided with any suitable form of fastening means as at G⁴.

Figure 1:
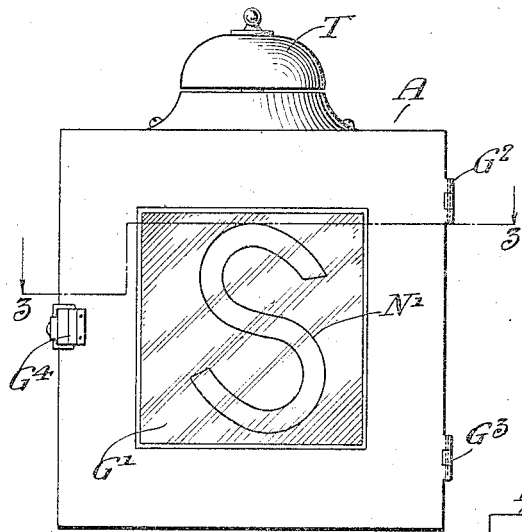
Figure 1 is a rear elevation of the device.
Figure 2:
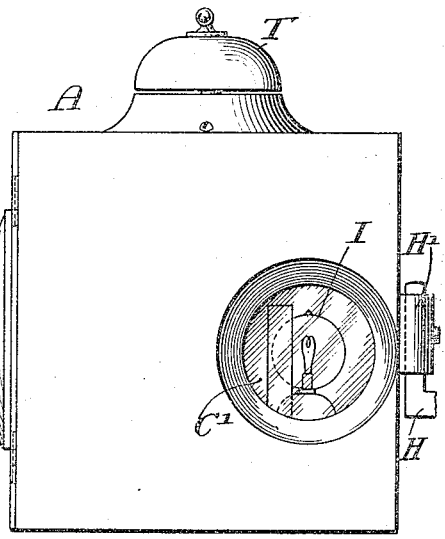
Fig. 2 is a side elevation from the right hand side of the view shown in Fig. 1.

The signaling box A may be lighted in any suitable manner, but I show herein, an electrical lamp I for the illumination of the same, and while I show said lamp connected to the same source of electrical supply as that which furnishes the electrical current for operating the indicating parts to be presently referred to, it will be understood that it may be connected to a separate source of electrical supply. Secured to the side member C are a plurality of electromagnets J, K, and to the bottom member D an electromagnet L, the means of fastening being immaterial so long as they are securely held in position, the fastening means indicated herein being the screws $L'$ passing through the sides and bottom members and into a plate attached to the respective magnets. Each of these magnets is adapted to operate a signaling plate indicated at M, N, O, respectively. The signaling plates will be preferably formed of some light material such as a thin sheet of mica, or the like, and will bear thereon an indicating letter or pointer, as shown for example in Fig. 3, wherein the arrow $M'$ points to the right hand; another of these indicating plates will bear an arrow pointing to the left hand, and the remaining indicating plate a letter S, as shown at $N'$ in Fig. 1. These indicating arrows or letters may be formed on the plates in any suitable manner but I preferably form them by painting the body or back ground of the plate an opaque black and the indicating letter or symbol thereon a translucent color, such as white so that the indicating letter or pointer may be readily discernible in the day time and permitting the transmission of light therethrough to make the same clearly discernible in darkness. Any suitable means, however, may be utilized to accomplish this result.

As each of the indicating plates M, N, O, are similar in construction, as well as the means of operating the same, it is thought that a description of one will suffice for a description of all.

Figure 3:
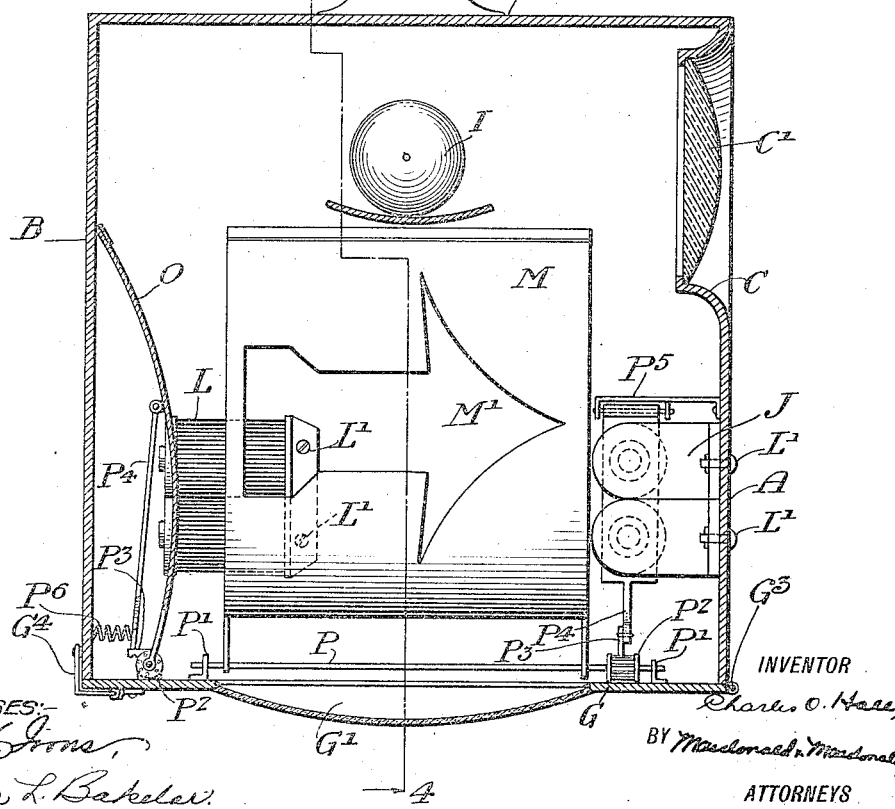
Fig. 3 is a horizontal section taken on the line 3—3 of Fig. 1 in the direction of the arrows.

Referring more particularly to Fig. 3, wherein front and side views are shown of the two indicating plates M, O, and their operating magnets, the indicating plate M is rigidly secured to a shaft P rotatably carried by the brackets $P'$, secured to the front member G. Keyed to the shaft P is a pinion $P^2$, the teeth of which are adapted to be engaged and actuated by a rack $P^3$ (see Fig. 5), one end of which rack has secured thereto an actuating lever $P^4$, the opposite end of said lever $P^4$ being pivotally mounted upon a bracket $P^5$ secured to the casing C. Secured to one end of the lever $P^4$, adjacent to the rack $P^3$ is a coiled spring $P^6$, the other end of said spring being secured to the bottom member D (see Fig. 4). It will be observed that under the action of said spring, the rack $P^3$ will be moved in a direction to actuate the shaft P in the direction shown by the arrow in Fig. 5, thereby carrying the indicating plate M into inoperative position and away from the tail light lens $G'$. When however, the electromagnet L is energized, the magnetic attraction between said magnet and the actuating lever $P^4$ will act to move said lever in a direction opposite to that just described and against the force of the spring $P^6$, rotating the pinion $P^2$ and the shaft P in a direction opposite to that indicated by the arrow in Fig. 5 and moving the indicating plate M into position to register with the tail light lens $G'$.

In Fig. 6 is shown diagrammatically the electrical circuit for operating the signaling system. Each of the magnets J, K, L, is wired so that either one may be energized from the battery indicated at Q. Arranged close to the operator of the vehicle, for instance as shown at R, indicating the steering wheel of an automobile, is a switch plate indicated at S, provided with push buttons indicated at $S'$, $S^2$, $S^3$, each of which is adapted to close and open the circuit in which is included one of the magnets J, K, L.

Conveniently mounted upon the casing of the signaling device, as upon the top member indicated at E, is an electric signaling bell T, which will preferably be in the same electrical circuit as, and in series with the magnets J, K, L, and switch plate S, so that whenever one of the push buttons $S'$, $S^2$, $S^3$, is actuated to energize one of the magnets J, K, L, the same electrical current at the same time will actuate the electric bell T, to attract attention to the direction indicators hereinbefore described.

It is thought that the operation of the device will be very clear from the foregoing description. However, if the driver of the automobile desires suddenly to make a turn to the right he pushes the button indicated for example at $S^2$, thereby closing the circuit which includes the electromagnet J, moving the actuating arm $P^4$ into contact with the magnet J, thereby actuating the rack $P^3$ and shaft P and moving the right hand pointer $M'$ into position in front of the tail light lens G, as indicated in dotted lines in Fig. 4. As soon as the operator has resumed his general direction of travel he releases the push button $S^2$ breaking the electrical circuit, and under action of the spring $P^6$, the arm M is retracted into its normal inoperative position, as shown in full lines in Fig. 4. The same operation will take place as to the other indicating arms N and O, by manipulating the respective buttons $S'$, $S^3$, as just described.

I wish it to be understood that I do not confine myself to the precise details of construction and arrangement herein set forth, as modification and variation may be made without departing from the spirit of the invention as defined by the appended claims.

What I claim is:

1. The combination with a plurality of indicating plates normally located in different planes, of means for moving said plates, one at a time, from said normal locations into a location common to all the plates, and electromagnetic means for operating said moving means.

2. The combination with a plurality of indicating plates normally located in different planes, of means for moving said plates, one at a time, from said normal locations into a location common to all the plates, electromagnetic means for operating said moving means, and means for returning said plates to normal location.

3. The combination with a plurality of indicating plates normally located in different planes, of means for moving said plates, one at a time, from said normal locations into a location common to all the plates and in a plane substantially at right angles to said first planes, electromagnetic means for operating said moving means, and automatic means adapted to be overcome by said electromagnetic means, for returning said plates to normal location.

CHAS. O. HALL.

Witnesses:
J. K. MACDONALD,
GLADYS ESHER.

Copies of this patent may be obtained for five cents each, by addressing the "Commissioner of Patents. Washington, D. C."